United States Patent Office 2,784,493
Patented Mar. 12, 1957

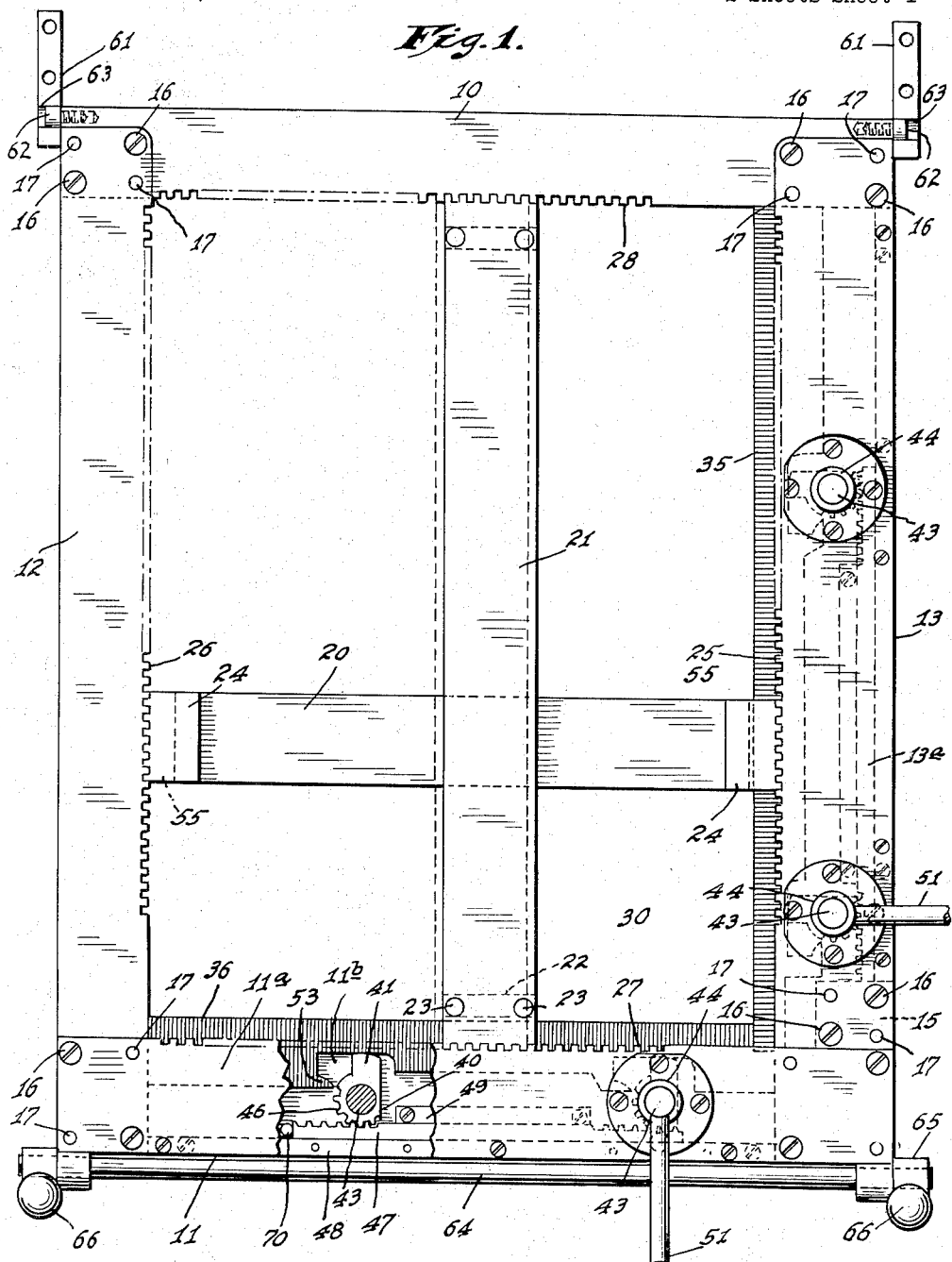

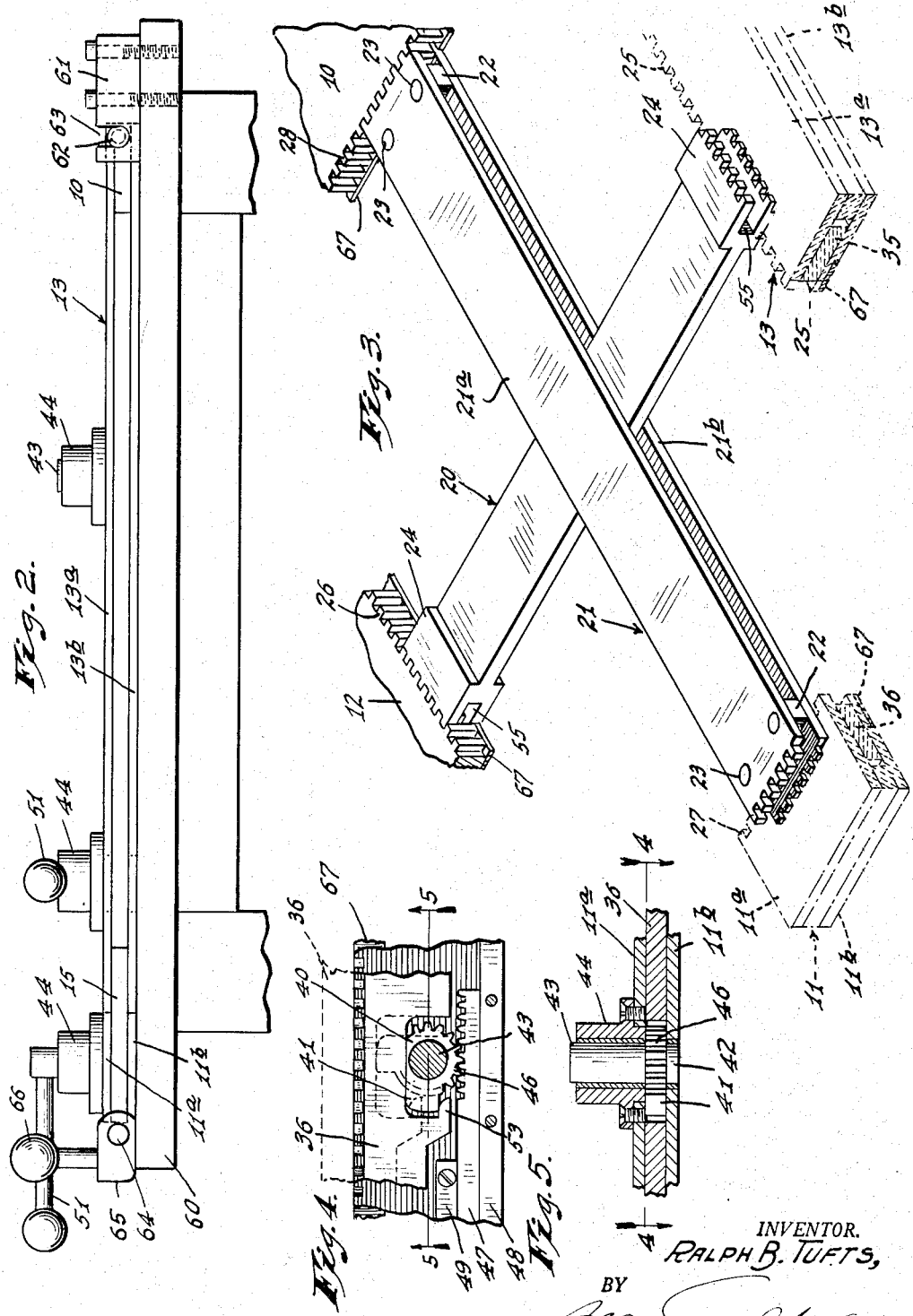

2,784,493

COMPOSING DEVICE

Ralph B. Tufts, Indianapolis, Ind., assignor to Cornelius Printing Company, Indianapolis, Ind., a corporation of Indiana Application October 7, 1952, Serial No. 313,434

1 Claim. (Cl. 33—80)

In the printing art, it is common to employ type-page forms made up of a multiplicity of individual elements such, for example, as electrotypes, Linotype slugs, hand-set type, leads, spacers, etc. Such individual elements are held in assembled relation in a rectangular chase by clamping pressure exerted longitudinally and laterally of the chase. In order for each individual element of the form to be held in place, it is necessary that it bear a portion of the clamping pressure; and as the sides of the chase are straight, it is therefore necessary for the compositor to so fill the form that each element thereof will sustain a portion of the clamping effort.

It is the purpose of this application to produce a gage which can be used by the compositor in composing the form to enable him to ascertain whether the form is properly justified, accurately rectangular, and of the proper size, and whether each element of the form will be subjected to the clamping effort necessary to retain it in its intended position. More particularly, it is an object of the invention to produce a compositor's gage which will possess, over prior gages, certain advantages by way of an improved and simplified construction and greater ease of adjustment.

In carrying out the invention, I employ an open rectangular frame provided with a pair of crossed bars extending longitudinally and laterally and adjustable laterally and longitudinally of the frame to define, in cooperation with two adjacent sides of the frame, a rectangular space within which the form is to be assembled. Associated with each of such adjacent frame sides is a feeler bar which extends parallel to the associated side and which is supported therefrom for movement transversely of itself into and out of the space in which the form is to be assembled. Means are provided for advancing and retracting the feeler bars, such means taking the form of a plurality of rotatable cams mounted in the frame-sides and adapted, when rotated, to apply inwardly directed forces to the feeler bar at points spaced along the length thereof.

Along their inner edges, the sides of the frame are provided with teeth adapted to engage with teeth on the ends of the crossed bars. The construction is so arranged that each bar is receivable in the frame with either of its sides uppermost, and the teeth on each bar are arranged asymmetrically with respect to the longitudinal center-line of the bar for a purpose which will hereinafter become apparent. To facilitate inversion of each bar and insertion of the bars into the frame, one of the bars includes separable upper and lower portions vertically spaced to receive the other bar between them.

Other objects and features of the invention will become apparent as the following description proceeds.

The accompanying drawings illustrate the invention:

Fig. 1 is a plan view of the complete gage with portions thereof broken away;

Fig. 2 is a side elevation of the gage mounted on the compositor's table;

Fig. 3 is a fragmental isometric view illustrating details of the crossed bars;

Fig. 4 is a fragmental section through one of the frame sides on the line 4—4 of Fig. 5; and Fig. 5 is a vertical section on the line 5—5 of Fig. 4.

The gage shown in the drawings comprises an upper side 10, a lower side 11, and longitudinal sides 12 and 13 assembled in the form of an open-centered rectangular frame. The upper side 10 and the longitudinal side 12 are mortised, lapped, and secured together. The frame-side 11 comprises upper and lower plates 11a and 11b, corresponding ends of which lap the lower end of the side 12, which is mortised to receive them. The side 13 likewise comprises upper and lower plates 13a and 13b the upper ends of which lap the adjacent end of the upper side 10. The sides 11 and 13 are united through the medium of a connecting member 15 which extends into the space between the plates 11a and 11b and also into the space between the plates 13a and 13b. Screws 16 and dowels 17 may be employed at the corners of the frame to complete the construction.

Extending transversely and longitudinally across the open center of the frame are a pair of crossed bars 20 and 21. As shown, the bar 21 comprises upper and lower plates 21a and 21b maintained in vertically spaced relation by transversely extending spacers 22 secured to the lower plate 21b near the ends thereof. In addition to the spacers 22, the plate 21b is provided at each end with one or more dowels 23 removably received in holes in the upper plate 21a. The bar 20 extends loosely through the space between the plates 21a and 21b and has at its ends heads 24 which conveniently are of the same thickness as the side members of the frame.

The plates 13a and 13b are provided along their inner edges with vertically aligned teeth 25 which are in alignment, laterally of the frame, with teeth 26 provided on the inner edge of the opposite side 12. The heads 24 of the bar 20 are provided with teeth meshing with the teeth 25 and 26 to hold the bar 20 in any of a series of longitudinally spaced positions of adjustment. For the same purpose, the plates 11a and 11b are provided with teeth 27 and the side 10 with teeth 28 which mesh with teeth on the ends of the plates 21a and 21b, the latter sets of teeth serving to hold the bar 21 in any of a series of laterally spaced positions.

The two bars 20 and 21, in cooperation with the two frame-sides 11 and 13, define a rectangular space 30 within which the type-form is to be composed. The nominal size of the space 30 can be varied by adjustment of the bars 20 and 21 in the manner just described. Variation in the size of the space 30 is in finite increments but, by the expedient now to be described, those finite increments are half the pitch of the teeth 25 to 28.

It will be noted from Fig. 1 that the teeth at the end of each bar are asymmetrically disposed with relation to the center-line of each bar. For example, it will be seen that the bar 21 has, at each of its left-hand corners (Fig. 1), a tooth received in a space between two of the teeth 27 or 28 and, at each of its right-hand corners a space which receives one of such teeth. As a result, by reversing the bar 21 to bring the notches to the left-hand corners and the teeth to the right-hand corners, the bar will be reinsertable in the frame in the position indicated by the dotted lines, where it will be spaced laterally of the frame from its original position by a distance equal to half the pitch of the teeth 28.

Separability of the two plates 21a and 21b facilitates not only the inversion of each bar but also the insertion of the bars into the frame. Without such separability, it would be necessary to bring the teeth at each end of each bar simultaneously into alignment with the teeth in the frame sides; for it would be necessary for both bars to enter the frame as a unit. Because of the separability provided by the removability of the plate 21a, it is possible to insert each bar (or each bar-plate in the case of the bar 21) into the frame individually and independently of the other bar. Specifically, to re-adjust the two bars, the uppermost plate of the bar 21, the bar 20, and the lowermost plate of the bar 21 will be removed from the frame in sequence; and in reinserting the bars, they would be sequentially positioned in reverse order.

The frame-side 13 has in association with it a feeler bar 35 which extends longitudinally of the frame-side and is slideably received between the two plates 13a and 13b of such frame-side for movement laterally of itself into and out of the open center of the frame. A similar feeler bar 36 is similarly associated with the lower side 11 of the frame. The two feeler bars may be advanced inwardly of the frame to reduce the dimensions of the rectangular space 30 and apply clamping effort to the type-form being assembled therein.

Mounted on the frame-sides 11 and 13 are means for advancing the feeler in the manner just mentioned. The means for advancing the two feelers are similar, and only one of them, that associated with the feeler 36, will be described in detail. Such means comprises a plurality of rotatable members 40, shown as two, mounted in the frame-side 11 in spaced-apart relation therealong. Each of the members 40 has a radially projecting finger 41 provided across its outer ends with a generally spiral cam-surface adapted to engage the feeler bar 36 and force it inwardly of the frame upon rotation of the member 40 in the clockwise direction (Figs. 1 and 4). Conveniently, the member 40 embodies aligned bearing portions 42 and 43, the latter rotatably received in the plate 11b and the former rotatably received in a bearing 44 secured to the upper plate 13a.

The two members 40 are interconnected for joint rotation. As shown, each member has an arcuate series of pinion teeth 46 meshing with teeth of a rack 47 which extends and is slidable longitudinally of the frame-side 11. As shown, the rack is guided for longitudinal sliding movement by guides 48 and 49 received between the upper and lower plates 11a and 11b. One of the bearing portions 43 of the two rotatable members associated with the frame-side extends upwardly above its bearing 44 and is there provided with a radially extending handle 51 by which the member 40 may be rotated.

The same means employed to advance the feeler 36 into the center of the frame may also be employed to retract it outwardly. For this purpose, the feeler may be provided with abutments 53 respectively engageable by the fingers 41 in counter-clockwise rotation of the members 40.

The feeler 35 is located longitudinally of itself by engagement at its upper end with the upper frame-side 10 and at its lower end with one side of a notch provided in the inner corner of the connecting member 15. The lower feeler 36 is supported against movement longitudinally of itself by engagement at one end with the frame-side 12 and at the other end by engagement with the side of the connecting member 15. One of the feelers, shown as the member 36, is notched to receive the other.

The heads 24 of the laterally extending bar 20 are provided across their outer faces with slots 55 to receive the advanced feeler bar 35. Reception of the feeler bar 36 in the ends of the longitudinally extending bar 21 is provided for by locating the spacers 22 of such bar inwardly from the ends of the bar. It is not essential that both ends of each of the bars 20 and 21 be adapted for reception of the feelers 35 and 36; but if each end of each bar is so adapted, it becomes unnecessary to differentiate between the ends in inserting the bars into the frame.

In use, the frame of the gage is supported on a base plate 60 which, as shown in Fig. 2, may be the top of a table. In the preferred arrangement, brackets 61 are secured to the base plate in spaced-apart relation to receive between them the upper end of the frame. Such upper frame-end is provided with aligned trunnions 62 pivotally receivable in upwardly opening notches 63 with which the brackets 61 are formed. This arrangement permits the lower end of the frame to be raised to test the type-form, as more fully set forth hereinafter. For the purpose of so raising the lower end of the frame, I may provide it with a rock shaft 64 which projects outwardly beyond the frame-sides 12 and 13 and is there provided with cam members 65 adapted upon rocking of the shaft 64 to engage the base plate, raise the lower frame-end, and support it in raised position. One or each of the cam members 65 may be provided with a handle 66 to facilitate rocking of the shaft 64.

To prevent the bars 20 and 21 from dropping out of the frame when it is raised as just described, or when it is removed from the base plate, I provide each frame-side along its lower inner edge with a metal strip 67 which extends inwardly of the frame approximately to the tips of the teeth 25, 26, 27, or 28. Desirably, the frame-sides and the ends of the bars 20 and 21 are rabbeted to receive such strip and permit the frame and bars to rest on the base plate 60.

In using the gage, the bars 20 and 21 are first positioned in the frame so that, with the feelers 35 and 36 advanced as shown in Fig. 1, the space 30 will have the dimensions of the type-form which is to be composed. With the cams 65 in position to permit the frame to rest on the base plate 60 and with the feelers 35 and 36 retracted to the full-line position shown in Fig. 4, the form is assembled in the space 30. From time to time, as the assembly of the form proceeds, the compositor advances one or both of the feelers 35 and 36 to test the over-all dimensions of the form and ascertain whether each element thereof will be subjected to clamping pressure in the chase. In such testing, the shaft 64 may be rocked to cause the cams 65 to raise the lower end of the frame. If any element of the form is not subjected to clamping effort when the frame is so raised, it will drop downwardly under the influence of gravity.

If desired, the feeler-advancing means may be provided with a stop which will limit its operation when the associated feeler reaches a predetermined point in its inward movement. Such a stop may take the form of an abutment pin 70 disposed in the path of the associated rack 47, as indicated at the bottom of Fig. 1.

The desired over-all size of the type-form is usually expressed as a multiple of a type-setter's unit of measurement such, for example, as a pica. In such a case, the pitch of the teeth 25 and 28 would be two picas. To change the adjustment of either bar 20 or 21 by an even number of picas, it would only be necessary to remove the bar from the frame, move it laterally of itself the required distance, and reinsert it. To change the position of the bar by a distance equal to an odd number of picas, the bar would be reversed before being reinserted into the frame. Such reversal can be effected by rotating the bar through 180° either about its own axis or about an axis normal to the plane of the frame. At least in the case of the composite bar 21, the latter rotation is preferred, since it maintains the removable plate 21a uppermost. Moreover, if a bar is to be reversable by rotation about its own axis it would be necessary to rabbet both of its faces to receive the strip 67.

I claim:

In a compositor's gage having an open rectangular frame and feelers mounted in two adjacent sides of the frame for movement laterally of themselves and independently of each other toward and away from the center of the frame, means for so moving said feelers, first and second crossed bars respectively extending longitudinally and laterally across said frame and co-operating with said two frame-sides to define a rectangular space within which a type-form is to be composed, means including co-operating provisions on the ends of the bars and on the frame for holding each bar in any of a plurality of predetermined positions spaced apart laterally of the bar, said provisions being engageable and disengageable by movement of the bar perpendicularly to the plane of the frame, said first bar comprising upper and lower plates spaced apart to receive the second bar between them, said plates being separable to permit removal of said other bar, the cooperating provisions of said first bar being provided on said plates, and means acting between said plates within the limits of the opening in said frame for maintaining the plates in vertically aligned positions.

References Cited in the file of this patent

UNITED STATES PATENTS

| | | |
|---|---|---|
| 506,873 | Davis | Oct. 17, 1893 |
| 667,946 | Miller | Feb. 12, 1901 |
| 1,105,758 | Clippinger et al. | Aug. 4, 1914 |
| 1,875,291 | Waggoner | Aug. 30, 1932 |
| 2,065,253 | Trotter | Dec. 22, 1936 |
| 2,114,946 | Trotter | Apr. 19, 1938 |
| 2,306,009 | Bradshaw | Dec. 22, 1942 |
| 2,583,495 | Roueche | Jan. 22, 1952 |

FOREIGN PATENTS

| | | |
|---|---|---|
| 2,200 | Great Britain | June 1, 1878 |
| 6,012 | Great Britain | Mar. 28, 1892 |
| 1,365 | Great Britain | Jan. 22, 1900 |